United States Patent [19]

Winzer et al.

[11] 4,294,603
[45] Oct. 13, 1981

[54] GLASS FOREHEARTH CONSTRUCTION

[75] Inventors: Frederick W. Winzer, East Granby; James R. Ault, New Britian, both of Conn.

[73] Assignee: Emhart Industries, Inc., Farmington, Conn.

[21] Appl. No.: 71,923

[22] Filed: Sep. 4, 1979

[51] Int. Cl.³ .............................................. C03B 5/16
[52] U.S. Cl. ...................................... 65/346; 65/337; 65/136; 65/356
[58] Field of Search ................ 65/337, 346, 347, 136, 65/137, 356

[56] References Cited

U.S. PATENT DOCUMENTS

| | | | |
|---|---|---|---|
| 2,144,973 | 1/1939 | Honiss | 65/137 |
| 2,616,380 | 11/1952 | Griffin | 65/346 X |
| 2,649,903 | 8/1953 | Russell | 65/337 X |
| 2,735,229 | 2/1956 | Honiss | 65/346 |

*Primary Examiner*—Arthur D. Kellogg
*Attorney, Agent, or Firm*—McCormick, Paulding & Huber

[57] ABSTRACT

An electrically heated and/or gas heated forehearth channel has a heat conductive refractory roof structure with arch blocks supported from the sides of the channel on side blocks, some of which side blocks may include gas burners for achieving rapid initial heating of the glass contained in the channel. Once the glass temperature has been raised close to normal operating temperature electrodes heat the glass by Joule effect electrical resistance heating, and the gas burners are no longer required. A roof superstructure is provided of insulating brick, and defines muffled cooling passageways such that the gas or electrically heated forehearth can be effectively operated by removing heat from the top of the conductive refractory arch block roof structure. Means is provided for selectively cooling the underside of these arch blocks when the gas burners are operated, or directing the flow of cooling air through the muffled cooling passageways in the roof superstructure when electric heat is employed.

1 Claim, 2 Drawing Figures

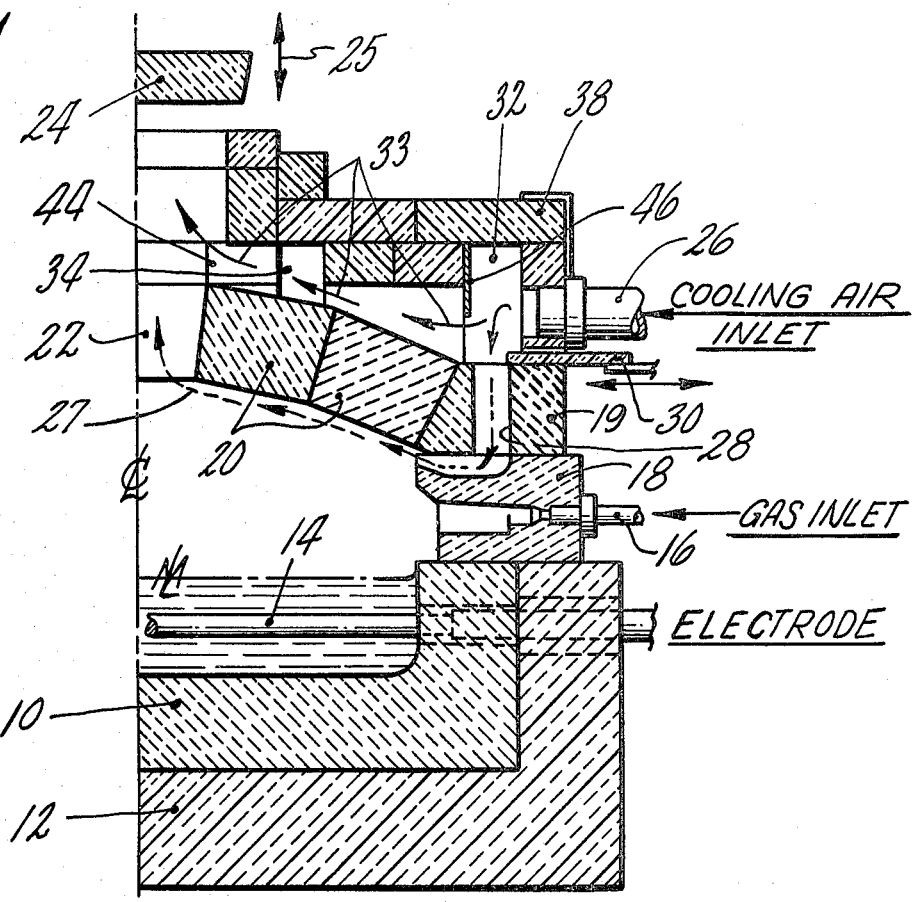
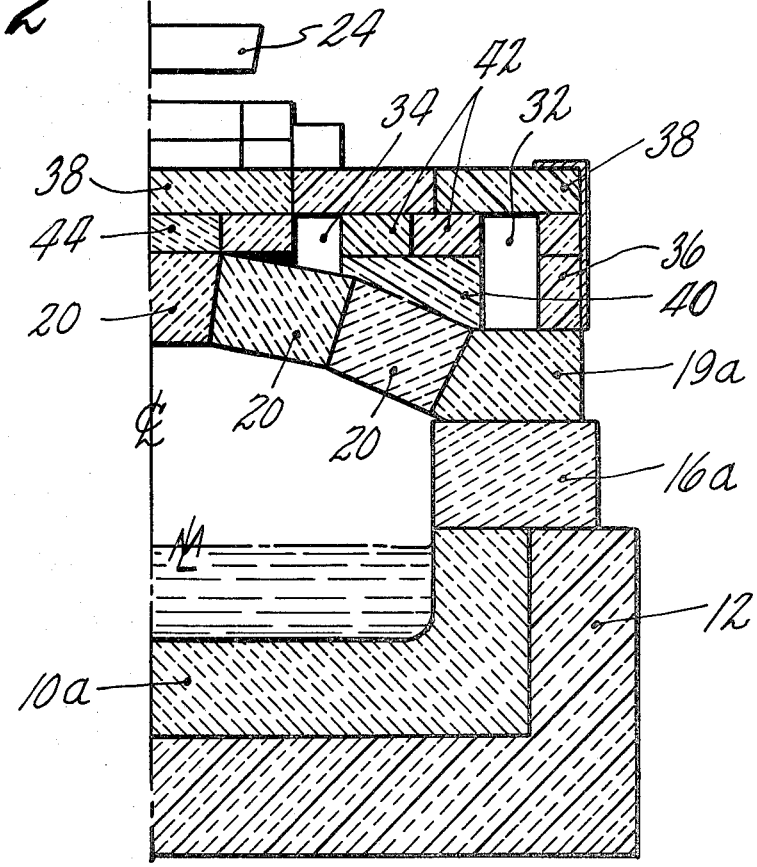

GLASS FOREHEARTH CONSTRUCTION

SUMMARY OF THE INVENTION

This invention relates generally to molten glass forehearths of the type used between a glass melting tank furnace and a feeder bowl, and deals more particularly with an improved muffled cooling roof superstructure for such a forehearth channel.

A typical glass forehearth comprises an elongated, generally horizontal, covered refractory channel structure projecting from the nose of a glass melting tank furnace with which it is operatively connected so that molten glass from the furnace flows in a continuous stream from the furnace through the forehearth channel to a feeder bowl, which forms the outer end portion of the forehearth, and from which the molten glass is fed in mold charges or gobs to a glassware forming machine. The roof structure for such a forehearth channel comprises side blocks, some of which have gas burners mounted therein, and arch blocks built up from the side blocks so as to form a roof structure for the channel. These blocks must withstand relatively high temperatures, on the order of 2,000° to 2,500° F., and are constructed of a refractory material which is heat conductive. When the glass in the channel is to be heated by these gas burners, cooling air is usually required to be injected into the space between the glass and the underside of the roof structure, which cooling air together with the combustion gases are exhausted through upwardly open ports in the roof structure. Means is provided for capping these openings in order to hold the heat in the forehearth, and it is an important feature of the present invention that electric heating is provided for maintaining the glass at the desired temperature once these gas burners have raised the temperature of the molten glass. As so operated, the electrical heating system does not require the insertion of cooling air directly into the chamber between the surface of the glass and the interior roof structure of the forehearth, and it is a feature of the present invention that the flow of cooling air can be directed across the upper surfaces of these refractory arch blocks so as to achieve a muffled cooling of the forehearth in lieu of the direct air cooling normally provided. These muffled cooling passageways are defined in a roof superstructure constructed of insulating blocks rather than the refractory blocks used in the roof structure itself.

The chief object of the present invention then is to provide greater flexibility in a forehearth construction such that the desired degree of cooling can be achieved to regulate the temperature of the glass within the forehearth channel whether the glass is heated by conventional gas burners, or by submersible electrodes operating directly on the glass and heating the glass by Joule effect resistance type heating.

BRIEF DESCRIPTION OF THE DRAWINGS

FIG. 1 is a vertical half-sectional view taken through a forehearth channel constructed in accordance with the present invention, and illustrates two alternative paths for the flow of cooling air, the broken line arrows indicating direct cooling of the underside of the refractory blocks of the roof structure, and the solid arrows indicating the flow of muffled cooling air through passageways defined in a roof superstructure constructed in accordance with the present invention.

FIG. 2 is a vertical sectional view taken at a different location along the forehearth channel, and illustrates the support for the roof superstructure defining the muffled cooling passageways.

DETAILED DESCRIPTION

Molten glass is prepared in a glass melting tank furnace upstream of the forehearth of the present invention, and flows through the channel of the forehearth, downstream to a feeder bowl or the like, where the glass is withdrawn for use in a glassware forming machine. The temperature of the glass passing from the supply furnace into the forehearth usually is higher than that desired for the glass to be fed or otherwise removed from the delivery end, and the glass temperature in the forehearth must be closely regulated during its travel through the forehearth so as to assure a desired temperature and hence viscosity of the glass at the feeder, for the formation of the desired glassware articles. Thus, the temperature of the molten glass may be reduced slightly when the glass is fed through the channel of the forehearth, and depending upon the size of the glassware being produced, this reduction in temperature may be as much as 300° to 400° F. in a typical forehearth. Also, the temperature of the glass entering the forehearth may be different in different installations, and changes may even be encountered at different times in the same installation. It has been found, therefore, that heat must be applied to the glass in the forehearth channel and that cooling must be effected in the forehearth in order to selectively apply these two parameters (heat and cooling) so as to maintain the desired temperature gradient from the inlet to the outlet end of the forehearth furnace. This invention provides a high degree of versatility for both the input of heat to the forehearth channel and for the withdrawal of heat as a result of cooling air being fed into the roof structure or superstructure of the forehearth as described below.

Turning now to the drawing in greater detail, FIG. 1 shows a forehearth channel 10 which channel is made up of a plurality of U-shaped refractory blocks similar to the block 10 and laid end to end in order to form the refractory channel for the molten glass, the surface of which glass is indicated generally at ML (metal line) in FIG. 1 and FIG. 2. Both FIGS. 1 and 2 are vertical half-sections through the forehearth furnace, and illustrate the configuration of the roof structure for the forehearth in some detail.

The forehearth channel blocks 10 and 10a in FIGS. 1 and 2 are preferably insulated as shown at 12 in accordance with conventional practice. The sidewall of the channel has an electrode 14 mounted therein and extending across the entire channel so as to cooperate with other electrodes also provided in a similar fashion at other locations in the forehearth, and to effect direct electrical heating of the glass through the application of electrical energy to pairs of these electrodes 14. Further, the forehearth shown in FIG. 1 is also equipped to heat the glass directly by the action of gas burners, one of which is indicated generally at 16, and it will be noted that other gas burners are provided along the length of the forehearth channel in accordance with conventional practice. These gas burners are provided in side blocks 18 which side blocks form part of the roof structure of the forehearth, and which side blocks are constructed of refractory material designed to withstand the 2,000° to 2,500° F. temperature inside the forehearth furnace, and which blocks are therefore somewhat conductive of heat as a matter of necessity.

The roof structure of the forehearth illustrated in FIGS. 1 and 2 includes arch blocks 20, 20 which are adapted to be supported by side blocks 19, 19a mounted on the blocks 16 and 16a as shown in the drawings. Also, top openings are provided in the roof structure, as indicated generally at 22 in FIG. 1, with the result that the gas burners can be operated to heat the glass, and the products of combustion can be exhausted through these top openings 22, and thence upwardly through the flue structure shown in the roof superstructure itself. The flue openings are fitted with conventional closure blocks 24. The closure blocks are adapted to be positioned vertically, as suggested by the arrow 25, in order to provide the desired degree of draft for operation of the gas burners 16. When the gas burners 16 are utilized to heat the glass rapidly, as for example after a shutdown, cooling air must be provided to cool the underside of the refractory roof structure 20 and a source of cooling air is provided in the form of inlet pipe 26 so that air can follow the path indicated by broken line 27, with the result that this cooling air mixes directly with the products of combustion from the gas burners 16 and is exhausted through the top openings 22 along with these products of combustion.

It is an important feature of the present invention that after the glass has been raised to a point at or near the desired operating temperature for the molten glass, that the gas burners 16 may be shut down and that electric heating, through the electrodes 14, may be provided as the preferred source of heat for the glass in the forehearth. In such case it is advantageous to interrupt the flow of direct cooling air downwardly through opening 28 in the side blocks 18 and 19, and such flow of direct cooling air is conveniently interrupted by operation of the slide valve 30 from the position shown, to the position suggested for it in broken lines in FIG. 1. As so configured, the forehearth may then be cooled by directing the cooling air from inlet pipe 26 through a plenum chamber 32 upwardly over the top of the refractory arch blocks 20, as indicated by the arrows 33, ultimately into the flue or top opening provided for the gas burner combustion products, and direct cooling air which is no longer required, such that these arch blocks can be effectively cooled because of their heat conductive characteristics.

The muffled cooling passageways for the air flow indicated by the arrows 33 in FIG. 1 are preferably defined in a roof superstructure which is supported by the side blocks and by the arch blocks, providing substantial heat transfer from the refractory brick roof structure, to the flow of muffled cooling air as indicated in FIG. 1.

Referring now to FIG. 2 in greater detail, the plenum chamber 32 extends longitudinally of the furnace forehearth, and so too, an intermediate plenum chamber 34 is also provided so as to provide a mixing of the muffled cooling air between adjacent transverse passageways to be described. The roof superstructure is made up of generally rectangular blocks, some of which are set on edge as shown at 36 in FIG. 2, and some of which are set horizontally so as to be supported by other blocks of similar insulating quality as shown at 38. A trapeziodally shaped block 40 is provided on end, and a plurality of such blocks are spaced longitudinally of the forehearth to support smaller longitudinally extending blocks 42, 42 as best shown in FIG. 2. This spacing between the trapeziodal blocks 40, 40 provides a passageway for the flow of muffled cooling air between plenum 32 and plenum 34. Longitudinally extending blocks 44, 44 are provided above the center, or keystone arch block 20, as illustrated in FIG. 2, but some of these blocks are eliminated to form the flue for the flow of combustion gases and direct cooling air, as well as to provide communication between this flue and the muffled cooling air passageways in the form of the transversely extending passageways just described.

As so constructed and arranged, the roof superstructure is conveniently fabricated from an insulating brick material and built up above the refractory heat conductive arch block and side block material in order to hold the heat of the glass within the forehearth furnace, but also to provide a convenient muffled cooling passageway for the flow of cooling air across the upper surface of the refractory arch blocks and outwardly through the top openings of the forehearth furnace. Finally, it should be noted that the cooling air inlets 26 are not provided opposite each transversely extending muffled cooling air passageway, so that a metal baffle 46 is preferably provided at the mouth of those muffled cooling air passageways opposite the cooling air inlet openings 26 so as to cause the flow of cooling air to move downwardly around under the baffle 46 with the result that some of this cooling air will pass longitudinally upstream and downstream in the plenum 32, and thence transversely of the forehearth furnace through adjacent muffled cooling air passageways and out through adjacent top opening flue structures of the type shown in FIG. 1.

We claim:

1. A molten glass forehearth comprising an elongated channel for constraining the flow of molten glass, a roof structure for said channel and including side blocks of heat conductive refractory material supported on the channel sides, said roof structure including arch blocks also of heat conductive refractory material supported on said side blocks, said roof structure defining top openings at longitudinally spaced locations in the forehearth, closure blocks supported in spaced relationship above said top openings, roof superstructure means supported by said side blocks and said arch blocks, said roof superstructure means including a plurality of longitudinally spaced blocks defining transverse muffled cooling air passageways therebetween, a source of cooling air communicating with the outer ends of said muffled cooling air passageways, inner ends of said muffled cooling air passageways communicating with said top openings, said roof superstructure further including insulating bricks supported by said longitudinally spaced blocks to provide for substantial heat transfer from said refractory brick roof structure to the cooling air flowing in said muffled cooling air passageways, said refractory blocks of said roof structure defining direct cooling air passages having inner ends communicating with the interior of said forehearth channel to direct air along the interior of the arch blocks toward said top openings, and outer ends of said direct cooling air passageways communicating with a plenum defined by said roof superstructure insulating bricks, said plenum also communicating with said transverse muffled cooling air passageways and with said source of cooling air, and means for selectively closing said direct cooling air passageways.

* * * * *